United States Patent [19]

Luck

[11] 4,003,586
[45] Jan. 18, 1977

[54] SWAY RESISTING STRUCTURE FOR TRAILERS

[75] Inventor: Jack R. Luck, Mentor, Ohio

[73] Assignee: Mentor Products, Inc., Mentor, Ohio

[22] Filed: Nov. 21, 1975

[21] Appl. No.: 634,268

[52] U.S. Cl. .......................... 280/446 B; 280/432
[51] Int. Cl.² .......................................... B60D 1/16
[58] Field of Search .......... 280/446 B, 446 R, 432, 280/406 A

[56] References Cited
UNITED STATES PATENTS

| | | | |
|---|---|---|---|
| 2,711,908 | 6/1955 | Saxon | 280/446 R X |
| 3,393,923 | 7/1968 | Rendessy | 280/432 |
| 3,400,948 | 9/1968 | Matson | 280/446 B X |
| 3,519,287 | 7/1970 | Pontbriand | 280/446 B |

Primary Examiner—Philip Goodman
Assistant Examiner—R. Schrecencost
Attorney, Agent, or Firm—Clarence A. O'Brien; Harvey B. Jacobson

[57] ABSTRACT

In a combination including a towing vehicle equipped with a ball type tow hitch and a trailer equipped with a forwardly projecting tongue portion having a socket type tow hitch mounted on its forward end removably universally coupled to the ball type tow hitch the free ends of a U-shaped frame are pivotally supported to the rear of the tow vehicle for oscillation about a horizontal transverse axis and with the frame opening in a horizontal direction and having its closed end spaced rearward of the ball-and-socket type tow hitches and underlying the tongue portion of the trailer. An adjustable caliper-type friction brake assembly provided with opposing and relatively adjustable generally horizontal and vertically spaced friction surfaces is stationarily supported from the tongue portion of the trailer with the closed end of the U-shaped frame disposed between the friction surfaces of the brake assembly. The closed end of the frame is of substantially constant radius of curvature and its center of curvature substantially coincides with a vertical axis extending through the removably coupled ball-and-socket type tow hitches. In this manner, relative angular displacement of the towing vehicle and trailer about an upstanding axis passing through the ball-and-socket type tow hitches is frictionally resisted to an extend (adjustable) enabling intentional relative angular displacement of the towing vehicle and the trailer such as occurs during turning operations, but frictionally resisting swaying movements of the rear end of the trailer from side to side during movement of the towing vehicle along a substantially straight path.

6 Claims, 8 Drawing Figures

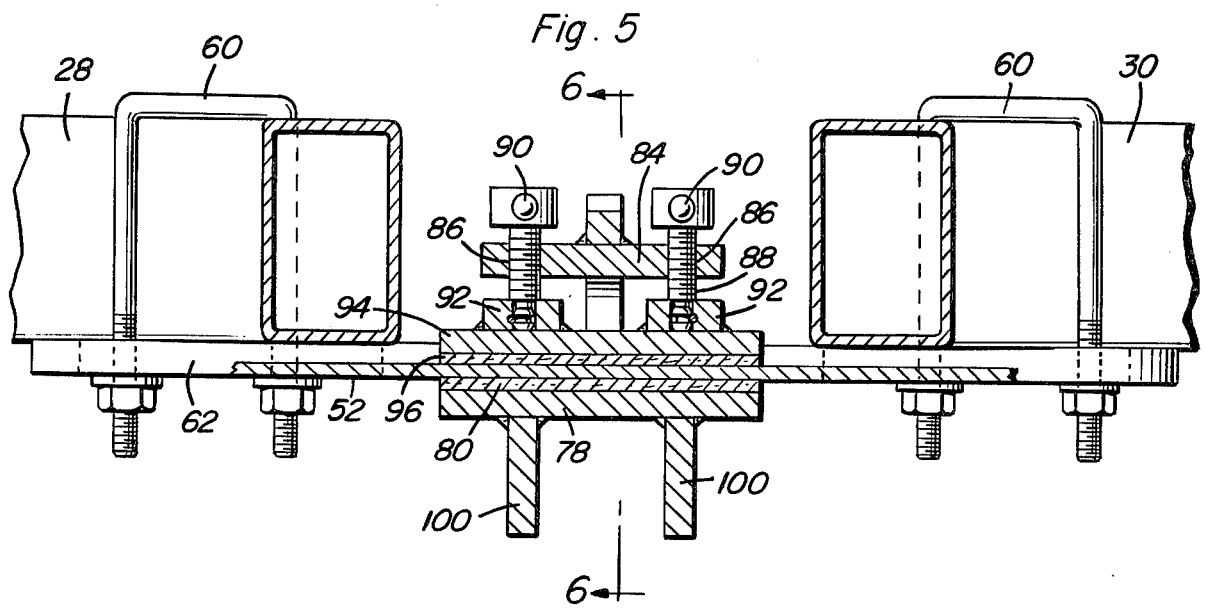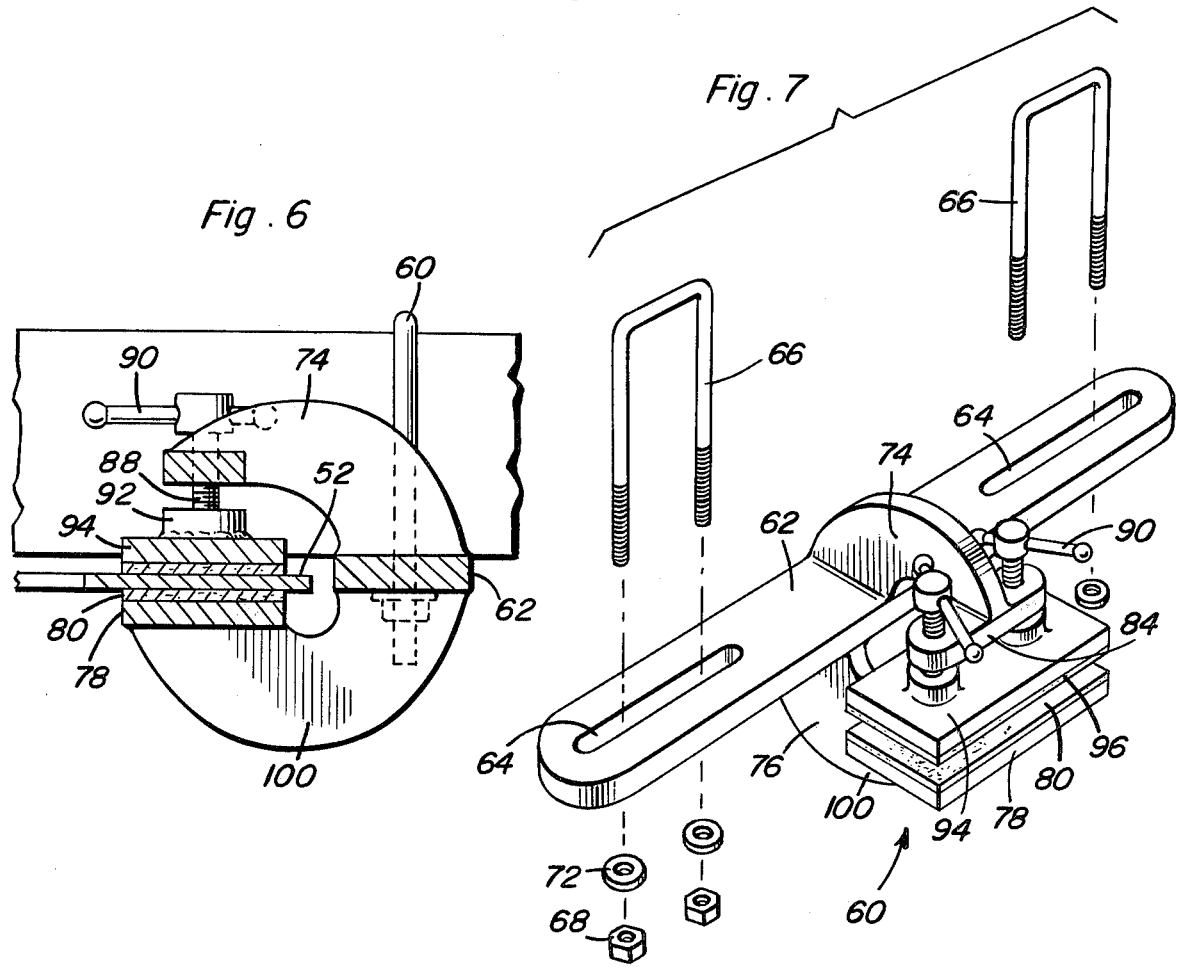

1

SWAY RESISTING STRUCTURE FOR TRAILERS

BACKGROUND OF THE INVENTION

Various forms of anti-swaying attachments for trailers have been heretofore designed, but none having high sway resistance ability have been provided for ready mounting on towing vehicles and trailers removably coupled together by conventional ball-and-socket type tow hitches with the anti-sway attachments requiring only slight modifications of the towing vehicle and no modifications of the associated trailer other than to removably clamp a portion of the anti-swaying attachment thereto.

Examples of previously patented anti-swaying attachments are disclosed in U.S. Pat. Nos. 2,685,545, 2,768,837, 3,297,340, 3,393,923, 3,400,948, 3,519,287 and 3,801,133.

BRIEF DESCRIPTION OF THE INVENTION

The anti-sway attachment of the instant invention requires only the addition of a pair of pivot mounts to the associated towing vehicle and the clamping of a relatively simple manually adjustable caliper type friction brake assembly to the tongue of an associated trailer. In this manner, the anti-sway attachment of the instant invention may be readily operatively associated with a towing vehicle and the trailer mounted portion thereof may be readily transferred from one trailer to another. Still further, that portion of the anti-sway attachment supported from the associated towing vehicle may have all but a pair of pivot mount portions thereof removed from the vehicle merely by removing a pair of pivot pins and the pivot mount portions of the anti-sway attachment which are permanently mounted to the towing vehicle do not constitute ojectionable appearance features and do not project excessively to the rear of the associated vehicle bumper. Further, the adjustable anti-sway attachment may be readily adjusted to resist swaying of the associated trailer during travel over generally straight roads or to enable relatively sharp turns to be navigated with reasonable frequency.

The main object of this invention is to provide an attachment for connection between a towing vehicle and a trailer which may be adjusted to provide varied frictional resistance against swaying of the trailer relative to the towing vehicle.

Another object of this invention, in accordance with the immediately preceding object, is to provide an anti-sway attachment whose vehicle and trailer supported components may be readily removably engaged with the vehicle and trailer.

Still another object of this invention is to provide an anti-sway attachment which may be utilized in conjunction with conventional ball-and-socket type tow hitch assemblies and without any permanent modifications of the associated trailer and only two small permanent modifications of the associated towing vehicle.

A still further object of this invention is to provide an anti-sway attachment which will not interfere with the mounting of LPG tanks on the tongue of the associated trailer.

Yet another object of this invention is to provide an anti-sway attachment which may be utilized in conjunction with and which will not interfere with the operation of load equalizing type of towing hitch assemblies.

A final object of this invention to be specifically enumerated herein is to provide a sway resisting attachment in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an enlarged transverse vertical sectional view taken substantially upon the plane indicated by the section line 5—5 of FIG. 4;

FIG. 6 is a fragmentary longitudinal vertical sectional view taken substantially upon the plane indicated by the section line 6—6 of FIG. 5;

FIG. 7 is a partially exploded perspective view of the trailer mounted portion of the anti-sway attachment including its attaching fastening means.

DETAILED DESCRIPTION OF THE INVENTION

Figure 1:
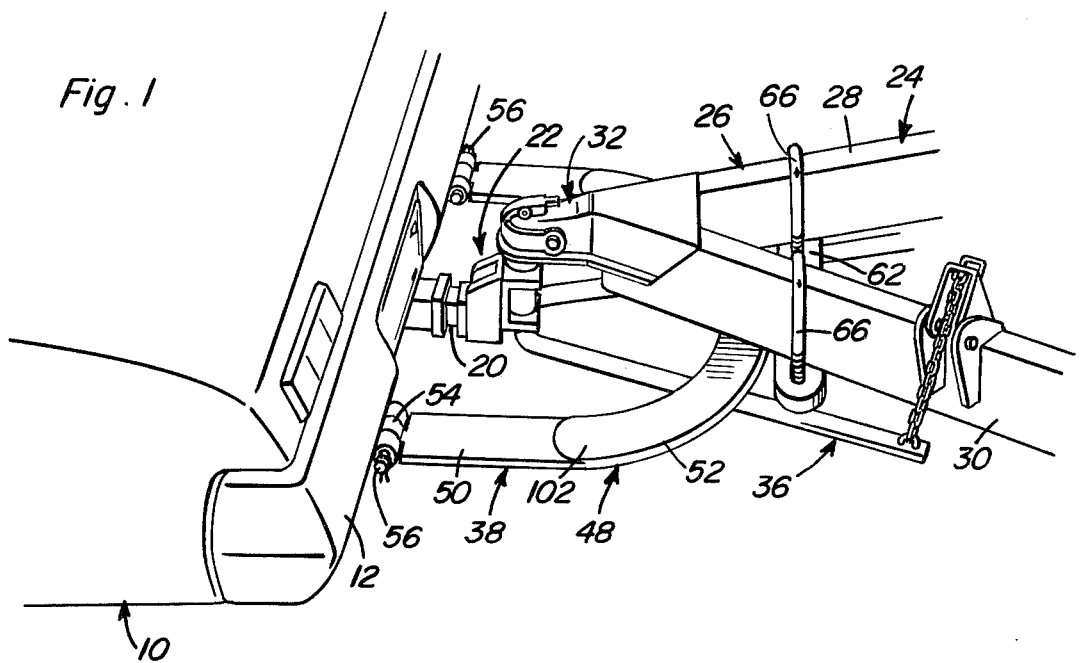
FIG. 1 is a fragmentary perspective view of conventional ball-and-socket type hitch assemblies utilized to removably couple the forward tongue portion of a trailer to the rear end of a towing vehicle and with the anti-sway attachment of the instant invention operatively associated with the towing vehicle and the trailer tongue.
Figure 2:
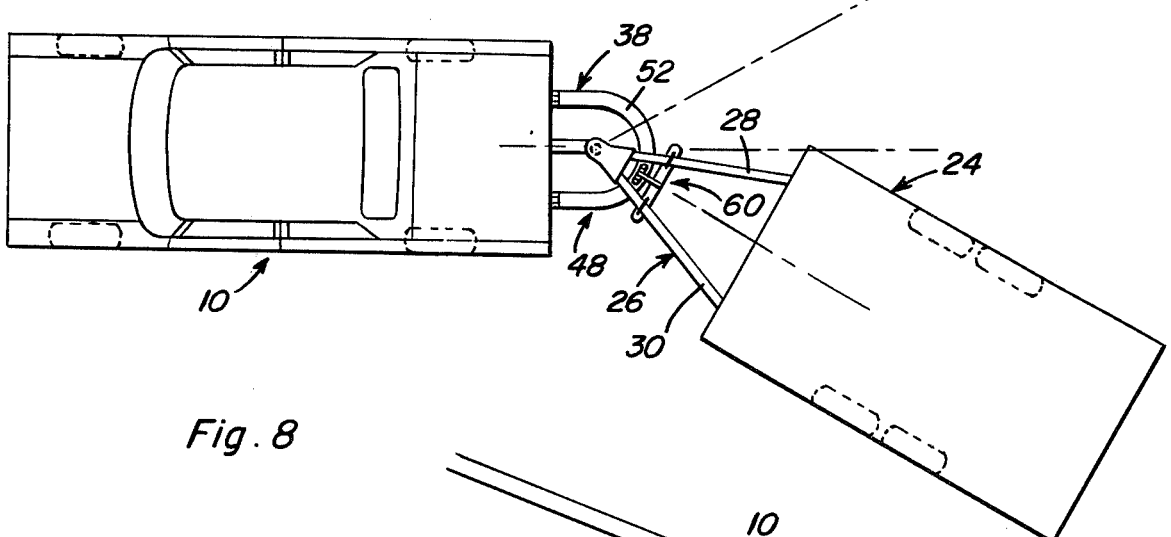
FIG. 2 is a schematic top plan view illustrating the relative positions of the towing vehicle and trailer mounted components of the anti-sway attachment when the towing vehicle and trailer are relatively angularly displaced.

Referring now more specifically to the drawings, the numeral 10 generally designates a towing vehicle including a rear bumper 12 and a rear cross member 14 of the frame of the vehicle 10 disposed beneath and forward of the bumper 12 and to which a frame mounted tow hitch mounting assembly referred to in general by the reference numeral 16 is secured. The tow hitch mounting assembly 16 defines a rearwardly opening socket 18 and a forwardly projecting shank portion 20 of a ball type tow hitch structure referred to in general by the reference numeral 22 is removably secured in the socket 18. The tow hitch mount assembly 16 and the ball type tow hitch structure 22 are conventional in design.

A trailer is referred to in general by the reference numeral 24 and includes a forwardly projecting tongue assembly referred to in general by the reference numeral 26 including a pair of forwardly convergent members 28 and 30 joined at their forward ends by means of a socket type tow hitch structure of conventional design referred to in general by the reference numeral 32 and removably coupled to the ball type tow hitch structure 22 in a conventional manner, the combination comprising the vehicle 10 and the trailer 24 also having a conventional form of tongue weight transferring structure referred to in general by the reference numeral 36 operatively associated therewith.

The foregoing comprises conventional towing structure frequently utilized between a towing vehicle and an associated trailer.

Figure 8:
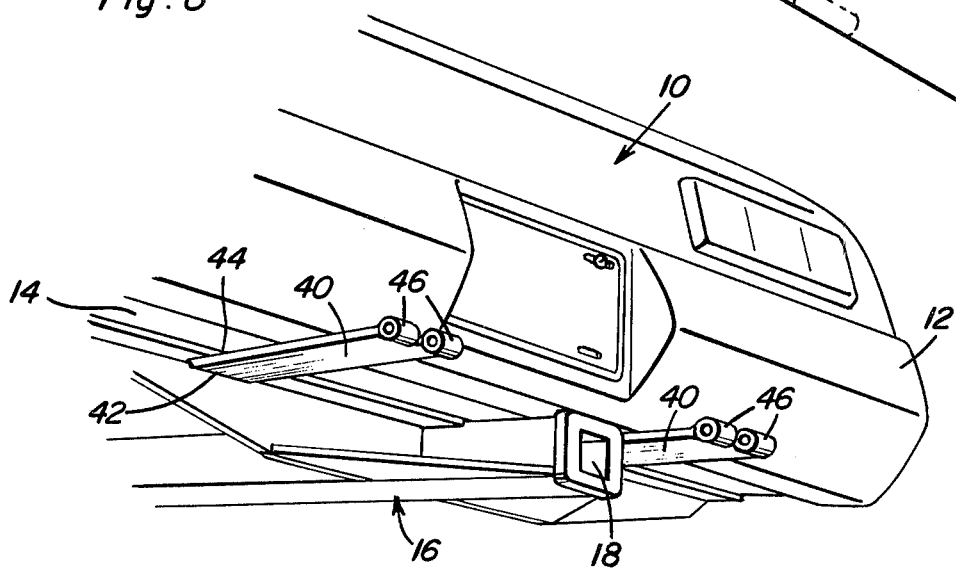
FIG. 8 is a fragmentary perspective view of the rear portion of the towing vehicle illustrating the hinge mount structure at least semi-permanently attached to the towing vehicle.
Figure 3:
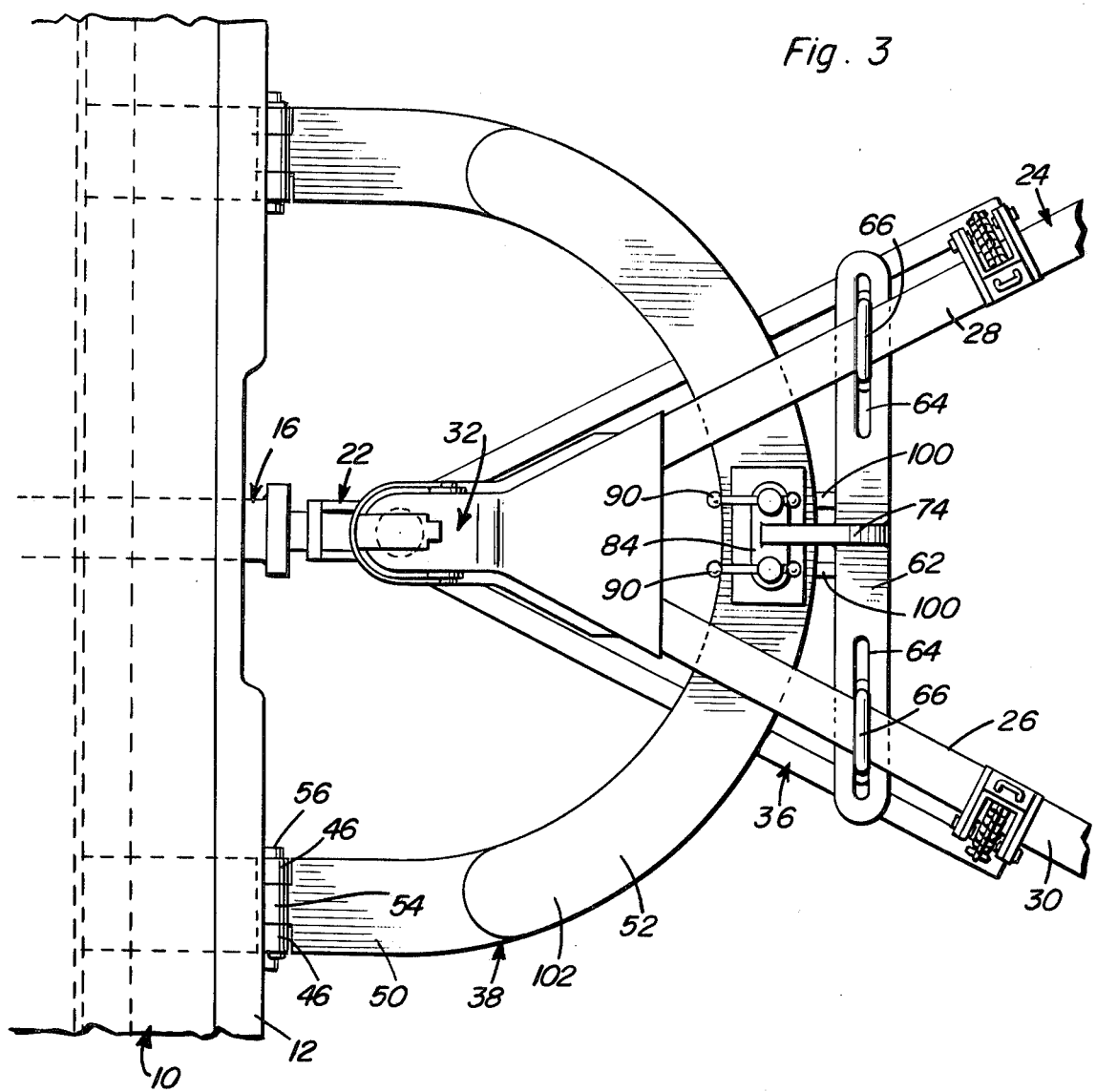
FIG. 3 is a fragmentary enlarged top plan view of the assemblage illustrated in FIG. 1.
Figure 4:
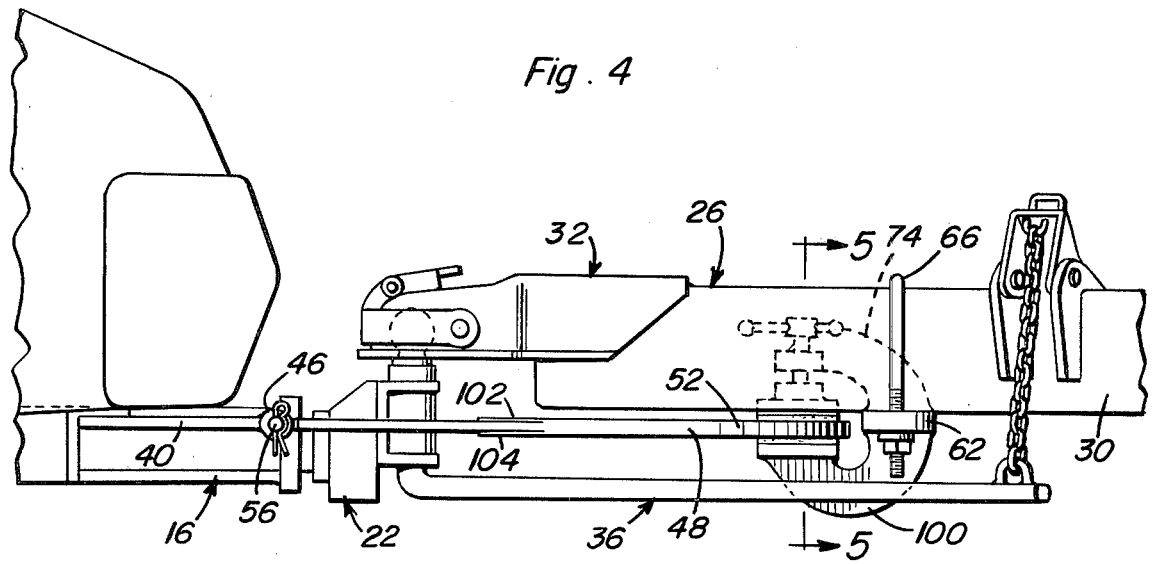
FIG. 4 is a side elevational view of the assemblage in FIG. 3.

The anti-sway attachment of the instant invention is referred to in general by the reference numeral 38 and includes a pair of rearwardly projecting support arms 40 having their forward ends secured to the tow hitch mounting assembly 16 and rear frame member as at 42 and 44, see FIG. 8. The rear ends of the arms include pairs of transversely spaced and aligned hinge barrels 46 and the arms 40 and their hinge barrels 46 comprise the only components of the attachment 38 which are permanently attached to the vehicle 10.

The attachment 38 further includes a horizontally disposed U-shaped frame referred to in general by the reference numeral 48 and constructed of steel plate cut to the desired shape. The frame 48 includes generally parallel legs 50 interconnected at their rear ends by means of a constant radius semicircular bight portion 52 and the forward ends of the legs 50 include single transverse hinge barrels 54 snugly receivable between the corresponding pairs of hinge barrels 46. The hinge barrels 54 are alignable with the hinge barrels 46 and a pair of hinge pins 56 are removably secured through the sets of corresponding hinge barrels 46 and 54.

In addition to the arms 40 and the frame 48 the attachment 38 includes a manually adjustable caliper type friction brake assembly referred to in general by the reference numeral 60. The brake assembly 60 includes a horizontal transverse mounting bar 62 having longitudinal slots 64 formed in its opposite ends and a pair of U bolts 66 equipped with threadedly engaged nuts 68 are utilized to clamp the bar 62 in position extending between and beneath the forwardly convergent members 28 and 30 of the tongue 26, see FIGS. 1, 5 and 7. The U bolts 66 are downwardly displaced over the forward end portions of the members 28 and 30 with the lower threaded ends of the U bolts 66 received through the corresponding slots 64 and secured therethrough by means of the corresponding nuts and attendant washers 72 in a manner which is believed to be obvious from FIGS. 1, 5 and 7.

The center portion of the bar 62 includes a first upper upwardly projecting and forwardly curving rigid arm 74 and a second lower downwardly projecting and forwardly curving rigid arm 76. The rear ends of the arms 74 and 76 are rigidly attached to the upper and lower surfaces of the mid-portion of the bar 62 and the forward upwardly facing end of the arm 76 is provided with a transverse horizontal and upwardly facing mounting plate 78 whose upper surface has a friction pad 80 secured thereover by means of bonding. In addition, the forward end of the arm 74 is provided with a transverse downwardly facing head 84 whose opposite ends are provided with upstanding threaded bores 86 downwardly through which clamp screws 88 are threadedly engaged. The upper ends of the clamp screws 88 disposed above the crosshead 84 are equipped with longitudinally slidable diametric handles 90 and the lower ends of the clamp screws 88 disposed beneath the crosshead 84 are captively rotatably journaled in journal blocks 92 carried by the upper surface of a transverse horizontal plate 94 to whose undersurface a friction plate or panel 96 is secured by means of bonding. The lower arm 76 comprises a pair of spaced side-by-side plates 100 secured to the underside of the bar 62 on opposite sides of a vertical plane containing the upper arm 74 and the forward ends of the plates 100 support opposite end portions of the plate 78.

From FIGS. 2 and 3 through 6 it may be seen that the bight portion 52 of the frame 48 is received between the friction panels 80 and 96. Accordingly, the bight portion 52 of the frame 48 is guided between the panels 80 and 96 for oscillation of the frame 48 relative to the arms 40 as the trailer 24 and vehicle 10 experience relative angular displacement about a horizontal transverse axis passing through the universal coupling of the ball-and-socket type hitch structures. Further, it may be appreciated upon a comparison of FIGS. 2 and 3 of the drawings that as the vehicle 10 and trailer 24 experience relative angular displacement about a vertical axis passing through the ball-and-socket type hitch structures the semi-cylindrical bight portion 52 of the frame 48 will swing between the friction panels 80 and 96. Accordingly, when the clamp screws 88 are threaded downwardly through the bores 86 the friction plates or panels 80 and 96 are caused to frictionally clamp the bight portion 52 therebetween so as to frictionally resist relative angular displacement of the vehicle 10 and trailer 24 about a vertical axis. If it is desired, the upper and lower surfaces of the bight portion of the frame 48 may be provided with special friction coatings 102 and 104, see FIGS. 1 and 4.

Inasmuch as the mounting bar 62 is provided with its opposite end longitudinal slots 64 and the U-shaped bolts 66 are utilized to clamp the bar 62 to the members 28 and 30 of the tongue 26, it may be readily appreciated that the friction brake assembly 60 may be easily mounted on substantially all types of trailers equipped with the equivalent of the forwardly convergent members 28 and 30. Further, the frame 48 is of low horizontal silhouette and does not interfere with the tongue weight transfer assembly 36. Still further, as hereinbefore set forth the frame 48 may be readily removed from the arms 40 whenever desired merely by removing the pins 56. Accordingly, the vehicle 10 may be readily prepared for over-the-road travel without having a trailer coupled thereto and the friction brake assembly 60 may be readily disconnected from the trailer 24 and applied to another trailer whenever desired.

Of course, the friction panels 80 and 96 may be readily replaced whenever desired and the clamp screws 88 may be easily tightened whenever extended travel is anticipated. Further the mounting bar 62 is substantially horizontally aligned with the space between the friction panels 80 and 96 and may therefore be mounted from the tongue assembly 26 in inverted position, if desired.

Whenever it is desired to temporarily disconnect the vehicle 10 from the trailer 26, it is merely necessary to disconnect the frame 48 from the arms 40. After being disconnected from the vehicle 10 the frame 48 may remain engaged by and supported from the friction brake assembly 60.

It is also pointed out for consideration that inasmuch as the pivot axis of the frame 48 relative to the arms 40 is spaced slightly forward of the vertical axis about which the vehicle 10 and trailer 24 may experience relative angular displacement, relative pitching movements of the vehicle 10 and trailer 24 are also frictionally resisted due to the fact that such relative pitching movements are accompanied by at least slight fore-and-aft shifting of the bight portion 52 relative to the friction brake assembly 60.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a towing vehicle and a trailer coupled to said vehicle for trailing therebehind and angular displacement relative to said vehicle about an upstanding axis, first generally horizontally disposed friction surface structure supported from said vehicle and extending rearwardly of said axis, second friction surface structure supported from said trailer rearwardly of said axis and frictionally engaged with said first friction surface structure frictionally resisting angular displacement of said trailer relative to said vehicle about said axis, said first friction surface structure including a rear portion generally semicircular in plan shape and positioned with its center of curvature generally coinciding with said upstanding axis, said first friction surface structure comprising a horizontally disposed forwardly opening U-shaped frame, the free ends of said frame being attached to said vehicle and the closed rear end of said frame comprising said rear portion and being of substantially constant radius of curvature with its center of curvature at least generally coinciding with said upstanding axis, said second friction surface structure comprising a clamp assembly mounted on said trailer and including relatively adjustable upper and lower downwardly and upwardly facing friction surfaces between which said closed end of said frame is received, the ends of said frame being pivotally supported from the rear of said vehicle for oscillation about aligned horizontal transverse axes, said aligned axes being spaced slightly forward of said upstanding axis.

2. The combination of claim 1 wherein one of said upper and lower friction surfaces is secured in stationary position relative to said trailer and the other of said upper and lower friction surfaces is supported for shifting toward and away from said one friction surface by means of clamp screw means operatively connected between said upper and lower friction surfaces.

3. The combination of claim 1 wherein said trailer includes a forwardly projecting tongue portion, mounting means mounting said second friction surface structure on said tongue portion for adjustable positioning therealong.

4. The combination of claim 3 wherein said mounting means also includes structure for adjustment of said second friction surface structure laterally of said tongue portion.

5. In combination with a towing vehicle and a trailer coupled to said vehicle for trailing therebehind and angular displacement relative to said vehicle about an upstanding axis, first generally horizontally disposed friction surface structure supported from said vehicle and extending rearwardly of said axis, second friction surface structure supported from said trailer rearwardly of said axis and frictionally engaged with said first friction surface structure frictionally resisting angular displacement of said trailer relative to said vehicle about said axis, said first friction surface structure including a rear portion generally semicircular in plan shape and positioned with its center of curvature generally coinciding with said upstanding axis, said first friction surface structure comprising a horizontally disposed forwardly opening U-shaped frame, the free ends of said frame being attached to said vehicle and the closed rear end of said frame comprising said rear portion and being of substantially constant radius of curvature with its center of curvature at least generally coinciding with said upstanding axis, said trailer including a forwardly projecting tongue portion, mounting means mounting said second friction surface structure on said tongue portion for adjustable positioning therealong, said mounting means also including structure for adjustment of said second friction surface structure laterally of said tongue portion, said second friction surface structure comprising a clamp assembly mounted on said trailer and including relatively adjustable upper and lower downwardly and upwardly facing friction surfaces between which said closed end of said frame is received, one of said upper and lower friction surfaces being secured in stationary position relative to said trailer and the other of said upper and lower friction surfaces is supported for shifting toward and away from said one friction surface by means of clamp screw means operatively connected between said upper and lower friction surfaces, the ends of said frame being pivotally supported from the rear of said vehicle for oscillation about aligned horizontal transverse axes, said aligned axes being spaced slightly forward of said upstanding axis.

6. In combination with a towing vehicle and a trailer coupled to said vehicle for trailing therebehind and angular displacement relative to said vehicle about an upstanding axis, first generally horizontally disposed friction surface structure supported from said vehicle and extending rearwardly of said axis, second friction surface structure supported from said trailer rearwardly of said axis and frictionally engaged with said first friction surface structure frictionally resisting angular displacement of said trailer relative to said vehicle about said axis, said first friction surface structure including a rear portion generally semi-circular in plan shape and positioned with its center of curvature generally coinciding with said upstanding axis, said first friction surface structure comprising a horizontally disposed forwardly opening U-shaped frame, the free ends of said frame being attached to said vehicle and the closed rear end of said frame comprising said rear portion and being of substantially constant radius of curvature with its center of curvature at least generally coinciding with said upstanding axis, the ends of said frame being pivotally supported from the rear of said vehicle for oscillation about aligned horizontal transverse axes, said aligned axes being spaced slightly forward of said upstanding axis.

* * * * *